July 13, 1943.                H. F. BENNETT                 2,324,057
                              LENS ATTACHMENT
                           Filed Sept. 3, 1941              2 Sheets-Sheet 1
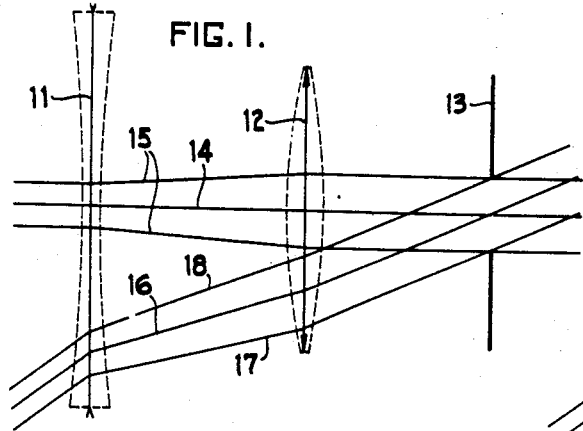
FIG. 1.
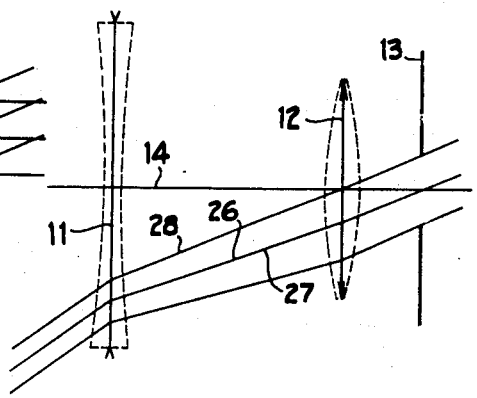
FIG. 2.
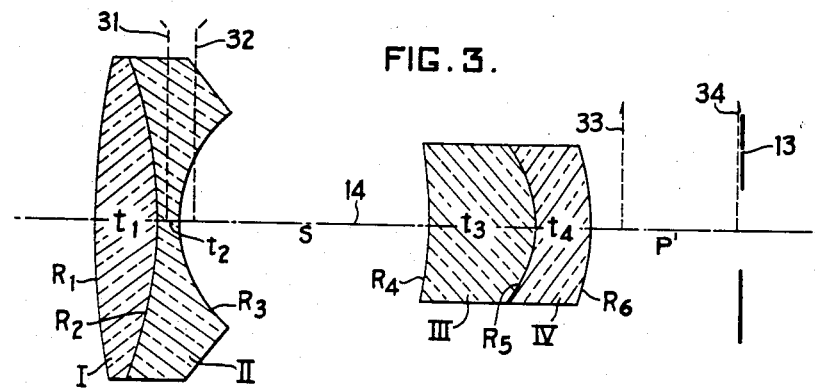
FIG. 3.
FIG. 4.
| EXAMPLE 1 | | | MAGN. 0.50 | |
|---|---|---|---|---|
| F NEG. = 39.8 mm. | | | F POS. = 79.5 mm. | |
| LENS | $N_D$ | V | RADII | THICKNESSES |
| I | 1.689 | 30.9 | $R_1$ = +74.7 mm | $t_1$ = 6.00 mm |
| II | 1.525 | 51.3 | $R_2$ = −40.8 | $t_2$ = 2.00 |
|  |  |  | $R_3$ = +13.0 |  |
|  |  |  |  | S = 23.85 |
| III | 1.620 | 60.4 | $R_4$ = −42.9 | $t_3$ = 10.00 |
| IV | 1.621 | 36.2 | $R_5$ = −11.7 | $t_4$ = 5.32 |
|  |  |  | $R_6$ = −26.0 | P' = 14.5 |
HAROLD F. BENNETT
INVENTOR
BY  Newton M. Perkins
ATTORNEY

| EXAMPLE 2 | | | | MAGN. 0.62 |
|---|---|---|---|---|
| $F_{NEG.}$ = 57.4 mm. | | | $F_{POS.}$ = 91.9 mm | |
| LENS | $N_D$ | V | RADII | THICKNESSES |
| I | 1.670 | 47.2 | $R_1$ = +50.9 mm | $t_1$ = 6.0 mm |
| II | 1.498 | 67.0 | $R_2$ = −120.9 | $t_2$ = 1.6 |
|  |  |  | $R_3$ = + 14.6 | S = 25.2 |
| III | 1.516 | 64.0 | $R_4$ = − 42.7 | $t_3$ = 10.0 |
|  |  |  | $R_5$ = − 24.3 | P' = 16.0 |

| EXAMPLE 3 | | | | MAGN. 0.62 |
|---|---|---|---|---|
| $F_{NEG.}$ = 39.7 mm. | | | $F_{POS.}$ = 64.1 mm. | |
| LENS | $N_D$ | V | RADII | THICKNESSES |
| I | 1.670 | 47.2 | $R_1$ = +40.7 mm | $t_1$ = 3.7 mm. |
| II | 1.498 | 67.0 | $R_2$ = − 87.0 | $t_2$ = 1.6 |
|  |  |  | $R_3$ = + 10.8 | S = 15.0 |
| III | 1.516 | 64.0 | $R_4$ = − 39.0 | $t_3$ = 10.0 |
|  |  |  | $R_5$ = − 19.5 | P' = 14.5 |

HAROLD F. BENNETT
*INVENTOR*

BY

*ATTORNEY*

Patented July 13, 1943

2,324,057

UNITED STATES PATENT OFFICE 2,324,057

LENS ATTACHMENT

Harold F. Bennett, Rochester, N. Y., assignor to Eastman Kodak Company, Rochester, N. Y., a corporation of New Jersey Application September 3, 1941, Serial No. 409,369

5 Claims. (Cl. 88—57)

This invention relates to lenses and particularly to wide angle attachments for photographic objectives, that is, to attachments for decreasing the focal length and increasing the angle of field of an objective.

The object of the invention is to provide an improved wide angle attachment with reduced distortion and one which is more economical to manufacture and more convenient to use than heretofore.

The art of placing an afocal Galilean telescope system in front of a photographic objective is well known. If the positive member of the telescope system is placed on the side nearer the objective the focal length of the whole combination is shorter than that of the objective alone, and a greater angle of field in the object space is imaged on the same area on the ground glass or photographic film. The ratio of the focal length of the combination to the focal length of the original objective is known as the magnification. It is to be noted that in wide angle attachments the magnification is less than unity.

The distance between the attachment and the main objective may be varied without affecting the magnification. However, if the full area on the film is to be filled, the rays of light leaving the attachment and falling on the front surface of the objective must fill a cone whose apex lies approximately in the entrance pupil of the objective and whose vertex angle is equal to the maximum useful field angle of the original objective. It is evident that the greater the distance from the objective the greater the aperture the attachment must have if the base of this cone of light is not to be occluded by the attachment. Accordingly it is of great advantage to mount the attachment as close as possible to the main objective, since the smaller diameter lenses are both cheaper to manufacture and more convenient to handle.

According to the present invention the positive component of the attachment is made meniscus in shape, concave toward the negative component, and with exceptionally great thickness of glass. Thicknesses greater than one-fourth of the air space between the two components of the attachment or greater than one-fifteenth of the focal length of the positive component of the attachment up to a thickness so great that the two components are actually in peripheral contact have been found useful. Preferably the thickness does not exceed about two-thirds the difference between the numerical values of the focal lengths of the two components.

The effect of the great thickness of glass is to shift the principal planes of the positive component closer to the main objective.

Accordingly, the negative component is also placed closer to the objective in order to have the proper optical separation from the positive component, and made smaller in diameter while still transmitting as great a cone of useful light. The distortion, being roughly proportional to the height of incidence of the oblique pencil of rays on the negative component, is thus reduced.

The negative component being smaller in diameter is also made thinner with equal ease of manufacture. As a result its rear principal plane, which lies behind the component itself, is closer to it. Therefore in maintaining its rear principal plane at a fixed distance from the front principal plane of the positive component the negative component is brought still nearer the objective and is made still smaller. Thus thickening the positive component according to my inventoin is in theory the start of a progression of changes all tending toward reduced over all size and reduced distortion. Of course in the design of a lens attachment according to the invention the changes are incorporated in the computations simultaneously.

For the negative component I have found it preferable to use a meniscus negative doublet consisting of a biconvex element of high refractive index preferably higher than 1.62 cemented to the front of a biconcave element of low index, preferably less than 1.55. This structure is effective in further reducing the distortion, and the meniscus shape flattens the field.

Of course, the position of the entrance pupil of the objective depends upon the type of objective and its focal length. It may be in front of, in the same plane, or behind the rear principal plane of the positive component of the attachment.

In the accompanying drawings:

Figs. 1 and 2 illustrate in a conventional manner some of the advantages of the invention.

Fig. 3 shows one form of the invention.

Fig. 4 shows constructional data for one embodiment of the form shown in Fig. 3.

Figures 5, 6, 7:
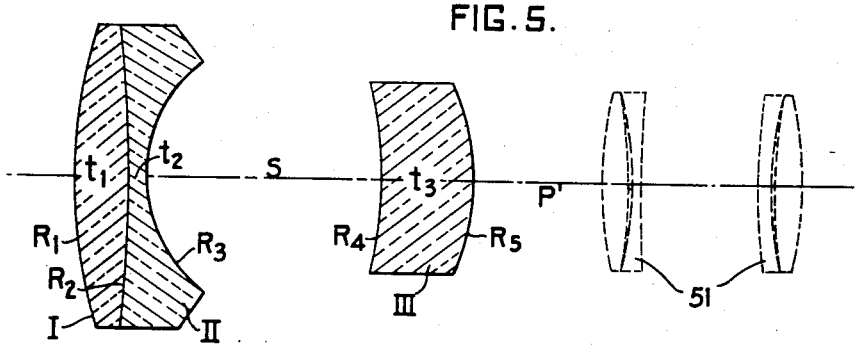
Fig. 5 shows another form of the invention.
Figs. 6 and 7 show constructional data for two embodiments of Fig. 5.

In the diagram of a wide angle attachment shown in Fig. 1, the principal planes 11 of the negative component are shown superimposed for simplicity. The principal planes of the positive component 12 are similarly superimposed on one another. The entrance pupil 13 of the objective is at a considerable distance from the positive component of the attachment. The ray 14 coinciding with the axis of the lens system and the rays 15 which strike the front surface parallel to the axis diverge after passing through the negative component and are rendered parallel again by the positive component since the system is afocal.

An oblique bundle of rays 16, 17, and 18 striking the front surface parallel to one another but at an angle to the axis emerge from the positive component parallel again but making a smaller angle with the axis. Thus a wider field angle in the object space is compressed into the angle that the main objective is adapted to receive.

Fig. 2 is drawn to the same magnification as Fig. 1, namely 0.62. The advantages of a shorter distance between the attachment and the pupil of the objective are shown in Fig. 2, the pupil 13 being closer to the principal plane 12 of the positive component. Arranged in this position the pupil transmits a different group of rays 26, 27, and 28, from the beam having the same incident obliquity as before. The lenses in Fig. 2 as shown by broken lines are much smaller than in Fig. 1 and still cover the same field.

According to the invention the plane 12 is moved closer to the pupil 13 by making the positive component very thick and meniscus in shape concave to the front.

One form of the invention is shown in Fig. 3, and the principal planes of the negative and positive components respectively are shown by dotted lines at 31, 32, 33, and 34. Due to the great thickness and the meniscus shape of the positive rear component its rear principal plane 34 is substantially at the pupil 13. By making the positive component still thicker the principal plane can be thrown even beyond the pupil.

It will be seen that the diameter of the positive component is not affected by this shift of the principal planes, but the reduction of the diameter of the negative component is valuable both because of its strong nearly hemispherical rear surface and because of the corresponding reduction of distortion.

The constructional data for one embodiment of the form of the invention shown in Fig. 3 are given in Fig. 4 and also as Example 1 in the table below. The positive component is divided into a cemented doublet for the purposes of achromatizing.

Another form of the invention is shown in Fig. 5, and the constructional data for two embodiments are shown in Figs. 6 and 7, and also given as Examples 2 and 3 below. In these examples the magnification is somewhat nearer unity and it was found that they were well achromatized without dividing the positive component into a doublet. The outline of one form of the main objective with which these attachments may be used in shown in dotted lines in Fig. 5. Examples 1 and 3 are intended for use with f/2 objectives of about 12 mm. focal length and Example 2 with f/2 objective of about 25 mm. focal length. The form of the main objective is not critical.

*Example 1, Figs. 3 and 4*

[Magnification 0.50]
F neg.=39.8 mm.    F pos.=79.5 mm.

| Lens | $N_D$ | V | Radii | Thicknesses |
|---|---|---|---|---|
| I | 1.689 | 30.9 | $R_1=+74.7$ mm. | $t_1=6.00$ mm. |
| II | 1.525 | 51.3 | $R_2=-40.8$ | $t_2=2.00$ |
|  |  |  | $R_3=+13.0$ | $S=23.85$ |
| III | 1.620 | 60.4 | $R_4=-42.9$ | $t_3=10.00$ |
| IV | 1.621 | 36.2 | $R_5=-11.7$ | $t_4=5.32$ |
|  |  |  | $R_6=-26.0$ | $P_1=14.5$ |

*Example 2, Figs. 5 and 6*

[Magnification 0.62]
F neg.=57.4    F pos.=91.9

| Lens | $N_D$ | V | Radii | Thicknesses |
|---|---|---|---|---|
| I | 1.670 | 47.2 | $R_1=+50.9$ mm. | $t_1=6.00$ mm. |
| II | 1.498 | 67.0 | $R_2=-120.9$ | $t_2=1.6$ |
|  |  |  | $R_3=+14.6$ | $S=25.2$ |
| III | 1.516 | 64.0 | $R_4=-42.7$ | $t_3=10.0$ |
|  |  |  | $R_5=-24.3$ | $P'=16.0$ |

*Example 3, Figs. 5 and 7*

[Magnification 0.62]
F neg.=39.7    F pos.=64.1

| Lens | $N_D$ | V | Radii | Thicknesses |
|---|---|---|---|---|
| I | 1.670 | 47.2 | $R_1=+40.7$ mm. | $t_1=3.7$ mm. |
| II | 1.498 | 67.0 | $R_2=-87.0$ | $t_2=1.6$ |
|  |  |  | $R_3=+10.8$ | $S=15.0$ |
| III | 1.516 | 64.0 | $R_4=-39.0$ | $t_3=10.0$ |
|  |  |  | $R_5=-19.5$ | $P'=14.5$ |

In these tables P′ refers to the distance from the rear surface of the attachment to the entrance pupil of the objective for which the attachment was specifically designed. In the examples shown this distance is rather large. This space is utilized for the mount of the objective and is of no optical advantage. However by the invention the principal plane is close to the objective entrance pupil and except when the space is needed for the mount, the attachment is placed even closer to the objective allowing proportionally smaller diameter for the elements.

In all three examples the thickness of the positive component $t_3$ or $t_3$ plus $t_4$ is greater than one fourth the separation S and also greater than one fifteenth of the focal length thereof. The maximum thickness is that for marginal contact of the component, and if it is increased beyond that point (which necessarily bends the rear component flatter and pushes the front component forward) the advantages of the invention are counteracted. Thus this thickness is preferably less than about two thirds "F pos." minus "F neg.," which are respectively the focal lengths of the positive and the negative components. The negative components are relatively thin for the two reasons given previously and have thicknesses between .10 and .25 times the corresponding differences in focal lengths of the components, but would be thicker if wider covering power were necessary. On the other hand, the distortion correction is enhanced by utilizing a high index biconvex element (preferably greater than 1.62 in index) cemented to the front of a low index biconcave element (preferably less than 1.55 in index) to form this front negative component. In the above tables and those in the drawings, $N_D$ is the index of refraction for the D line of the spectrum and V is the dispersive index of the glass used in each element.

Although the preferred forms of any wide angle attachments are afocal, the separation of the components may, of course, be varied somewhat so that the attachment is not strictly afocal. In general however, the relationship is approximately afocal. Also the attachment is provided in the usual way with a mount adapted to be detachably secured to the mount of the camera objective.

I claim:

1. A wide angle attachment for use on the front of a photographic objective, comprising a negative component axially aligned and approximately afocally spaced in front of a meniscus positive component which is concave to the front and which has an axial thickness greater than one fourth of the air space between the two components and not greater than that for which the components are in marginal contact.

2. A wide angle attachment according to claim 1 in which the negative component is compounded of at least one positive and one negative element and has an axial thickness between .10 and .25 times the difference between the numerical values of focal lengths of the two components.

3. A wide angle attachment according to claim 1 in which the negative component consists of a biconvex element with index of refraction greater than 1.62 cemented to the front of a biconcave element with index of refraction less than 1.55.

4. A wide angle attachment for use on the front of a photographic objective, comprising a negative component axially and approximately afocally spaced in front of a meniscus positive component which is concave to the front and which has an axial thickness greater than one-fifteenth of the focal length of the positive component and less than two thirds the difference between the numerical values of the focal lengths of the two components.

5. A wide angle attachment according to claim 4 in which the negative component consists of a biconvex element with index of refraction greater than 1.62 cemented to the front of a biconcave element with index of refraction less than 1.55

HAROLD F. BENNETT.